US008657019B2

(12) United States Patent
Pone

(10) Patent No.: US 8,657,019 B2
(45) Date of Patent: Feb. 25, 2014

(54) HYDROCARBON RECOVERY ENHANCEMENT METHODS USING LOW SALINITY CARBONATED BRINES AND TREATMENT FLUIDS

(75) Inventor: Jean Denis Pone, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 496 days.

(21) Appl. No.: 13/013,328

(22) Filed: Jan. 25, 2011

(65) Prior Publication Data

US 2011/0198081 A1 Aug. 18, 2011

Related U.S. Application Data

(60) Provisional application No. 61/304,065, filed on Feb. 12, 2010.

(51) Int. Cl.
*E21B 43/16* (2006.01)
(52) U.S. Cl.
USPC ........................................ 166/402; 166/305.1
(58) Field of Classification Search
None
See application file for complete search history.

(56) References Cited

U.S. PATENT DOCUMENTS

| | | | |
|---|---|---|---|
| 3,363,685 A | 1/1968 | Blackwell et al. | |
| 3,995,693 A | 12/1976 | Cornelius | |
| 4,042,029 A | 8/1977 | Offeringa | |
| 4,319,635 A | 3/1982 | Jones | |
| 4,502,538 A | 3/1985 | Wellington et al. | |
| 4,569,393 A | 2/1986 | Bruning et al. | |
| 4,665,987 A | 5/1987 | Sandiford et al. | |
| 4,683,948 A | 8/1987 | Fleming | |
| 4,762,178 A | 8/1988 | Falls et al. | |
| 4,921,576 A | 5/1990 | Hurd | |
| 5,632,336 A * | 5/1997 | Notz et al. | 166/402 |
| 5,855,243 A | 1/1999 | Bragg | |
| 6,024,167 A | 2/2000 | Irani | |
| 7,137,447 B2 | 11/2006 | Shpakoff et al. | |
| 7,455,109 B2 * | 11/2008 | Collins | 166/275 |
| 7,581,594 B2 | 9/2009 | Tang | |
| 7,600,567 B2 | 10/2009 | Christopher et al. | |
| 7,677,317 B2 | 3/2010 | Wilson | |
| 2010/0206565 A1 | 8/2010 | Embry | |

FOREIGN PATENT DOCUMENTS

GB 669216 3/1952

OTHER PUBLICATIONS

U.S. Appl. No. 61/304,106, filed Feb. 12, 2010, Pone.

(Continued)

*Primary Examiner* — Angela M DiTrani
(74) *Attorney, Agent, or Firm* — ConocoPhillips Company

(57) ABSTRACT

Methods and systems of hydrocarbon recovery use treatment fluids comprising low salinity carbonated water. Certain embodiments comprise forming a carbonated aqueous solution formed of either fresh water or low salinity water and introducing the carbonated aqueous solution into a formation to enhance hydrocarbon recovery. Low salinity brines may be used in lieu of or in combination with the foregoing fresh water. The carbonated water or low salinity carbonated brine may be introduced as a treatment fluid through a secondary well and used to provide a motive force to sweep the hydrocarbons towards one or more production wells. The carbonated water may be produced at a well site through a desalination process that uses naturally occurring brine as its feed. Using fresh water or law salinity brines allows a higher concentration of carbon dioxide to be dissolved in the water, which enhances hydrocarbon recovery.

15 Claims, 1 Drawing Sheet

(56) References Cited

OTHER PUBLICATIONS

Ralph L. Nelms, Westport Oil and Gas Company, Randolph B. Burke, North Dakota Geological Survey, "Evaluation of Oil Reservoir Characteristics to Assess North Dakota Carbon Dioxide Miscible Flooding Potential", 12th Williston Basin Horizontal Well and Petroleum Conference, May 2-4, 2004, 11 pages.

Bray and Foster, "Process for Primary Migration of Petroleum in Sedimentary Basins", American Association of Petroleum Geologists Bull., Association Round Table, AAPG-SEPM Annual Meeting, 63:697-8 (1979).

V. Prigiobbe, M. Hanchen, G. Costa, R. Baciocchi, and M. Mazzotti, "Analysis of the Effect of Temperature, pH, CO2 Pressure and Salinity on the Olivine Dissolution Kinetics", Science Direct, 2009, pp. 4881-4884.

M. Zeidouni, M. Pooladi-Darvish, and D. Keith, University of Calgary, "Sensitivity Analysis of Salt Precipitation and CO2-Brine Displacement in Saline Aquifers", SPE 126690, 2009, pp. 1-16.

H.R. Crawford, G.H. Neill, B.J. Bucy and P.B. Crawford, "Carbon Dioxide—A Multipurpose Additive for Effective Well Stimulation", The Western Co., Texas A&M College, SPE 571, Mar. 1963, pp. 237-242.

PCT Notification of Transmittal of the International Search Report and the Written Opinion of the International Searching Authority, or the Declaration, Forms PCT/ISA/220, 210 and 237, Date of Mailing: Mar. 28, 2011, 11 pages.

Christensen, R.J., Carbonated Waterflood Results—Texas and Oklahoma. In Annual Meeting of Rocky Mountain Petroleum Engineers of AIME, 1961: Farmington, New Mexico, 1961.

Hickok, C.W.; Christensen, R.J.,; H.J. Ramsay, J. Progress Review of the K&S Carbonated Waterflood Project. SPE Journal of Petroleum Technology 1960, 12, (12), 20-24.

Ross, G.D..; Todd, A.C.; Tweedie, J.A.; Will, A.G.S., The Dissolution Effects of CO2-Brine Systems on the Permeability of U.K. and North Sea Calcareous Sandstones. In SPE Enhanced Oil Recovery Symposium, 1982 Copyright 1982, Society of Petroleum Engineers of AIME: Tulsa Oklahoma, 1982.

Shelton, J.I., The Effects of Water Injection on Miscible Flooding Methods Using Hydrocarbons and Carbon Dioxide. 1975, 15, (3), 217-226.

* cited by examiner

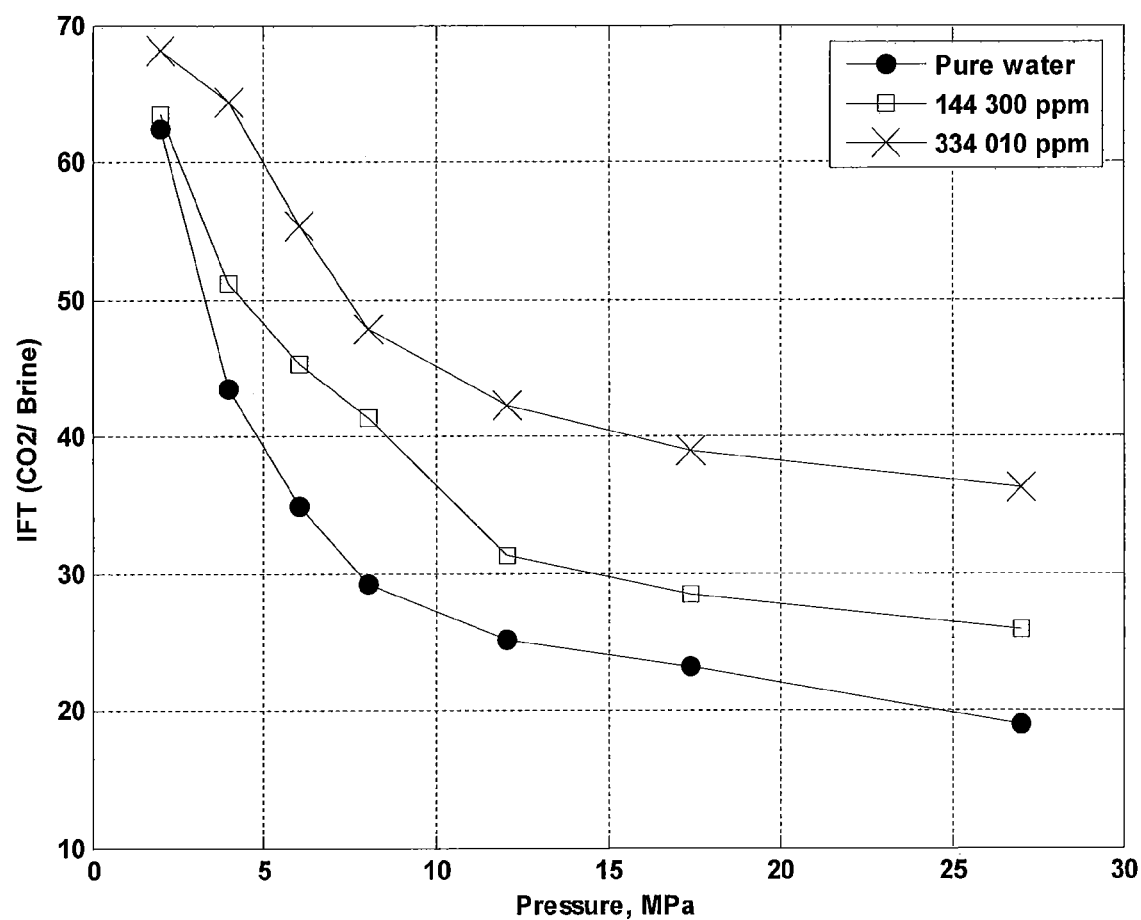

HYDROCARBON RECOVERY ENHANCEMENT METHODS USING LOW SALINITY CARBONATED BRINES AND TREATMENT FLUIDS

CROSS-REFERENCE TO RELATED APPLICATIONS

This application is a non-provisional application which claims the benefit of and priority to U.S. Provisional Application Ser. No. 61/304,065 filed Feb. 12, 2010, entitled "Hydrocarbon Recovery Enhancement Methods Using Low Salinity Carbonated Brines and Treatment Fluids," which is hereby incorporated by reference in its entirety.

FIELD OF THE INVENTION

The present invention relates generally to methods and systems for enhancing hydrocarbon recovery. More particularly, but not by way of limitation, embodiments of the present invention include methods and systems for enhancing hydrocarbon production recovery and production through secondary operations comprising treating formations with low salinity carbonated water.

BACKGROUND

Increasing the recovery of hydrocarbons from existing reservoirs is a continuing challenge. Although a myriad of techniques exist for enhancing the recovery of hydrocarbons, some conventional methods for enhancing the recovery of hydrocarbons include steam flooding and water flooding, also known as enhanced oil recovery (EOR) methods.

These conventional methods often involve injection of steam or water into a secondary injection well to provide a motive force to push remaining hydrocarbon reserves in the formation towards the production well. In this way, these secondary operations assist in the recovery of hydrocarbons that may have otherwise remained in the formation. Where a water flood is desired, operators typically employ naturally occurring brine water as to the motive driver.

Another enhanced oil recovery method relies on carbon dioxide injection. It has been discovered that the addition of carbon dioxide ($CO_2$) to a formation assists in enhancing recovery of hydrocarbons by a variety of mechanisms. For example, carbon dioxide has the beneficial effect of reducing the viscosity of the hydrocarbons, allowing for more efficient flow of the hydrocarbons through the formation. Because of the low viscosity of carbon dioxide, however, a phenomenon, known as viscous fingering, often occurs where the carbon dioxide forms circuitous channels and bypasses portions of the formation due to heterogeneities of the formation and the differing viscosity of the carbon dioxide as compared to the formation fluids. This viscous fingering often reduces the efficiency of carbon dioxide injection as an enhanced oil recovery method to a point of infeasibility. In this way, it is well known that the low viscosity of carbon dioxide and hence its high mobility in oil reservoirs adversely affects the sweep efficiency during carbon dioxide injection.

To overcome this bypassing problem, operators have employed various injection strategies including carbonated brine injection (e.g. introducing carbon dioxide into naturally occurring brines, which are then used as an enhanced treatment fluid). Naturally occurring brines however are known to have a high salinity. The solubility of carbon dioxide in naturally occurring brines, however, is greatly limited due to the high salinity of the brine water commonly used. To obtain a significant improvement in oil recovery, the amount of carbon dioxide (liquid or dense-gas) available in the brine must exceed a certain minimum. Thus, the limited dissolvability of carbon dioxide in high salinity brines adversely affects the enhancement potential of the high salinity carbonated brine. As a result, carbonated brine injection projects are generally not successful because of an insufficient transfer of carbon dioxide from water to oil due to the low carbon dioxide content of the high salinity brine. Indeed, this low carbon dioxide content is further magnified by the problem that minerals in the formation often consume injected carbon dioxide such that the injected carbon dioxide is unavailable for enhancement of hydrocarbon recovery.

Accordingly, conventional methods of using high salinity carbonated brines in secondary operations suffer from the disadvantage of being limited in their carbon dioxide content, which adversely affect the ability of the high salinity carbonated brine to enhance recovery of hydrocarbons.

SUMMARY

The present invention relates generally to methods and systems for enhancing hydrocarbon recovery. More particularly, but not by way of limitation, embodiments of the present invention include methods and systems for enhancing hydrocarbon production recovery and production through secondary operations comprising treating formations with low salinity carbonated water.

One example of a method for enhanced hydrocarbon recovery comprises the steps of: extracting a formation brine; treating the formation brine to reduce the salinity of the formation brine to form a low salinity brine; introducing carbon dioxide into the low salinity brine to form a carbonated low salinity brine; introducing the carbonated low salinity brine into the formation through one or more injection wells; allowing the carbonated low salinity brine to enhance recovery of hydrocarbons in the formation by forming a mixture of the carbonated low salinity brine and the hydrocarbons and by acting as a motive force driving the hydrocarbons towards one or more production wells; and producing the hydrocarbons and the mixture from the one or more production wells.

Another example of a method for enhanced hydrocarbon recovery comprises the steps of: introducing carbon dioxide into a low salinity brine to form a carbonated low salinity brine; introducing the carbonated low salinity brine into the formation through one or more injection wells; allowing the carbonated low salinity brine to enhance recovery of hydrocarbons in the formation; and producing the hydrocarbons and the mixture from the one or more production wells.

Yet another example of a method for enhanced hydrocarbon recovery comprises the steps of introducing carbon dioxide into fresh water to form a carbonated aqueous solution; introducing the carbonated aqueous solution into the formation through one or more injection wells; allowing the carbonated aqueous solution to enhance recovery of hydrocarbons in the formation; and producing the hydrocarbons and the mixture from the one or more production wells.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 1 shows a relationship of $CO_2$/brine interfacial tension as a function of brine salinity and pressure.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for enhancing hydrocarbon recovery. More particularly, but not by way of limitation, embodiments of the present invention include methods and systems for enhancing hydrocarbon production recovery and production through secondary operations comprising treating formations with low salinity carbonated water.

In certain embodiments, methods for enhanced hydrocarbon recovery comprise the steps of forming a carbonated aqueous solution formed of either fresh water or a low salinity water, and introducing the carbonated aqueous solution into a formation to enhance hydrocarbon recovery from the formation. In some variations, low salinity brines may be used in lieu of or in combination with the foregoing fresh water. The carbonated water or low salinity carbonated brine may be introduced as a treatment fluid through a secondary well and used to provide a motive force to drive or "sweep" the hydrocarbons towards one or more production wells.

In certain embodiments, low salinity brines and/or fresh water may be produced at a well site through a desalination process that uses naturally occurring brine as its feed. The desalination process may use any process known in the art suitable for desalinating water, including, but not limited to, a reverse osmosis process. Any source of low salinity or fresh water may be used in conjunction with the methods of the present invention as desired.

Using fresh water or law salinity brines is advantageous in that it allows a higher concentration of carbon dioxide to be dissolved in the water, which, as described further below, enhances hydrocarbon recovery. Advantages of the present invention are numerous, and include, but are not limited to, more efficient hydrocarbon recovery as compared to conventional methods, lower operational costs, reduced formation damage, and/or any combination thereof.

Another advantage of certain embodiments of the present invention is that a higher carbon dioxide content of the injected water may allow for the introduction of more carbon dioxide than is necessary for hydrocarbon recovery enhancement. In such cases, operators may be able to benefit from being able to claim a credit for the downhole sequestration of excess carbon dioxide in the formation that would not be possible with the limited conventional methods.

Another advantage of certain embodiments of the present invention is that a higher carbon dioxide content of the injected water may eliminates swabbing in most cases; helps remove or prevents water and emulsion blocks; helps prevent clay swelling and precipitation of iron and aluminum hydroxides; and increases permeability of carbonate formations.

Another advantage of certain embodiments of the present invention is that the combination of higher carbon dioxide content and the low salinity of the injected water provide better environment for the application of others enhanced oil recovery chemicals such as surfactants and polymers compatible with carbon dioxide.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In short, methods disclosed herein propose increasing the amount of carbon dioxide available in the formation to enhance the mobility of oil by the use of low salinity carbonated water. It is designed, in part, to co-optimize the benefits of both direct carbon dioxide flooding and water flooding in a single process. The present invention provides methods for increasing the amount of carbon dioxide available in the formation brine to enhance recovery of hydrocarbons by decreasing the salinity of water and thus increasing the solubility of carbon dioxide in the water.

Carbonated low salinity water flooding has advantages over direct carbon dioxide or straight low salinity brine injection as it has better sweep efficiency and takes advantage of the synergistic effects of both low-salinity and carbon dioxide flood. For example, increasing carbon dioxide concentration in a treatment fluid can significantly reduce the interfacial tension of the treatment fluid as illustrated in FIG. 1. A reduced interfacial tension of the treatment fluid, among other benefits promotes mixing of the treatment fluid and the hydrocarbons, which further enhances hydrocarbon recovery. Carbonated low salinity injection can also alleviate the adverse effect of high water saturation and the water shielding effects as a result of mixing with the resident water. This in turn facilitates carbon dioxide dissolution and the subsequent oil swelling. In direct carbon dioxide injection, it has been shown that, due to low sweep efficiency and gravity segregation, the time scale for carbon dioxide diffusion in oil can be several years.

Additionally, additional advantages of using low salinity carbonated water injection include, but are not limited to, a reduction of formation damage. This reduction in formation damage may be, in part, due to the higher acidity of the carbonated water that may be achieved by either reducing the salinity of the treatment injection water or by using fresh water. Furthermore, the higher acidity may also inhibit the swelling of formation clays. Additionally, the higher acidity carbonated water may also act as a biocide to reduce slime-forming bacteria or other live growths in input wells.

The following prior art references are hereby incorporated by reference:

Christensen, R. J., Carbonated Waterflood Results—Texas and Oklahoma. In Annual Meeting of Rocky Mountain Petroleum Engineers of A/ME, 1961: Farmington, N.M., 1961.

Hickok, C. W.; Christensen, R. J.; H. J. Ramsay, J., Progress Review of the K&S Carbonated Waterflood Project. SPE Journal of Petroleum Technology 1960, 12, (12), 20-24.

Ross, G. D.; Todd, A. C.; Tweedie, J. A.; Will, A. G. S., The Dissolution Effects of CO2-Brine Systems on the Permeability of U.K. and North Sea Calcareous Sandstones. In SPE Enhanced Oil Recovery Symposium, 1982 Copyright 1982, Society of Petroleum Engineers of AIME: Tulsa, Okla., 1982.

Shelton, J. L., The Effects of Water Injection on Miscible Flooding Methods Using Hydrocarbons and Carbon Dioxide. 1975, 15, (3), 217-226.

To facilitate a better understanding of the present invention, the following examples of certain embodiments are given. In no way should the following examples be read to limit, or define, the scope of the invention.

EXAMPLE

The following experiment demonstrates the efficacy of certain embodiments of the present invention. In one experiment, a sandstone core sample, 1.5 inch in diameter and 3 inches length, saturated with oil and high salinity carbonated brine (35000 ppm) Swi was placed in a coreholder. Next, a 500 psi overburden pressure was applied to the core sample.

The core holder containing the sample was then connected to an automatic controlled pump that delivered high salinity carbonated brine at a chosen flow rate (Q) calculated based on physical characteristics of the sample. Pressures upstream and downstream of the sample were recorded using high precision pressure transducers for permeability determination. The permeability was computed using Darcy's law for one dimensional flow of a homogeneous fluid through porous media.

After the pressure drop across the core stabilized and the high salinity carbonated brine permeability was established, a second pump was connected to deliver fresh carbonated water, and the first pump was connected to an inline mixer. The two pumps were set in a way that the high salinity carbonated brine delivering rate ramped down from Q to 0, while the fresh carbonated water delivering rate ramps up from 0 to Q. The total flow rate exiting the mixer was constant at Q during the entire experiment. This step gradually and continuously decreased the water salinity from 35,000 ppm to 0 ppm while increasing the amount of carbon dioxide. The effluent was collected throughout the process and analyzed for oil content.

Then, the process was changed back to high salinity carbonated brine to verify any incremental recovery benefit. After the pressure drop across the core stabilized and the high salinity carbonated brine permeability was reestablished, the flow rate was changed abruptly (i.e. shocked) from the high salinity carbonated water solution to fresh carbonated water. This step confirmed that the sample used was sensitive to water chemistry and the injection scheme. The effluent was again collected throughout the process and analyzed for oil content.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A method for enhanced hydrocarbon recovery comprising the steps of:
    extracting a formation brine;
    introducing carbon dioxide into the formation brine to form a carbonated brine;
    introducing the carbonated brine into the formation through one or more injection wells, wherein salinity of the carbonated brine introduced into the formation is decreased over time as concentration of the carbon dioxide in the carbonated brine is increased;
    allowing the carbonated brine to enhance recovery of hydrocarbons in the formation by forming a mixture of the carbonated brine and the hydrocarbons and by acting as a motive force driving the hydrocarbons towards one or more production wells; and
    producing the hydrocarbons and the mixture from the one or more production wells.

2. The method of claim 1 wherein the salinity of the brine being introduced into the formation is decreased gradually to less than about 1 ppm total dissolved solids.

3. The method of claim 1 wherein the salinity of the brine being introduced into the formation is decreased from an initial dissolved solids concentration of naturally occurring brine.

4. The method of claim 3 wherein the carbonated brine has a concentration of total dissolved solids (TDS) decreased from the initial dissolved solids concentration to less than about 10,000 ppm.

5. The method of claim 1 further comprising treating the formation brine with a reverse osmosis process to produce distilled water used for the introducing the carbon dioxide and lowering the salinity of the formation brine.

6. The method of claim 1 wherein the carbonated brine has a concentration of total dissolved solids (TDS) of less than about 100,000 ppm.

7. The method of claim 6 wherein the carbonated brine has a concentration of total dissolved solids (TDS) of less than about 50,000 ppm.

8. The method of claim 7 wherein the carbonated brine has a concentration of total dissolved solids (TDS) of less than about 25,000 ppm.

9. The method of claim 8 wherein the carbonated brine has a concentration of total dissolved solids (TDS) of less than about 10,000 ppm.

10. A method for enhanced hydrocarbon recovery comprising the steps of:
    introducing carbon dioxide into a saline solution to form a carbonated brine;
    introducing the carbonated brine into the formation through one or more injection wells, wherein salinity of the carbonated brine introduced into the formation is decreased over time as concentration of the carbon dioxide in the carbonated brine is increased;
    allowing the carbonated brine to enhance recovery of hydrocarbons in the formation; and
    producing the hydrocarbons from one or more production wells.

11. The method of claim 10 wherein the carbonated brine has a concentration of total dissolved solids (TDS) of less than about 100,000 ppm.

12. The method of claim 11 wherein the carbonated brine has a concentration of total dissolved solids (TDS) of less than about 50,000 ppm.

13. The method of claim 12 wherein the carbonated brine has a concentration of total dissolved solids (TDS) of less than about 25,000 ppm.

14. The method of claim 13 wherein the carbonated brine has a concentration of total dissolved solids (TDS) of less than about 10,000 ppm.

15. A method for enhanced hydrocarbon recovery comprising the steps of:
   introducing carbon dioxide into fresh water to form a carbonated aqueous solution;
   introducing a mixture of brine and the carbonated aqueous solution into the formation through one or more injection wells, wherein amount of the brine in the mixture is decreased over time as amount of the carbonated aqueous solution in the mixture is increased;
   allowing the carbonated aqueous solution to enhance recovery of hydrocarbons in the formation; and
   producing the hydrocarbons from one or more production wells.

* * * * *